J. W. WEBB.
PAPER AND PAPER BOX TESTING MACHINE.
APPLICATION FILED SEPT. 23, 1918.

1,413,305.

Patented Apr. 18, 1922.
5 SHEETS—SHEET 2.

Inventor
John W. Webb,
By Rector, Hibben, Davis & Macauley
His Attys.

J. W. WEBB.
PAPER AND PAPER BOX TESTING MACHINE.
APPLICATION FILED SEPT. 23, 1918.

1,413,305.

Patented Apr. 18, 1922.
5 SHEETS—SHEET 5.

UNITED STATES PATENT OFFICE.

JOHN W. WEBB, OF CHICAGO, ILLINOIS, ASSIGNOR, BY MESNE ASSIGNMENTS, TO WEBB TESTER INCORPORATED, OF CHICAGO, ILLINOIS, A CORPORATION OF DELAWARE.

PAPER AND PAPER-BOX TESTING MACHINE.

1,413,305.  Specification of Letters Patent.  Patented Apr. 18, 1922.

Application filed September 23, 1918. Serial No. 255,272.

*To all whom it may concern:*

Be it known that I, JOHN W. WEBB, a citizen of the United States, residing at Chicago, in the county of Cook and State of Illinois, have invented certain new and useful Improvements in Paper and Paper-Box Testing Machines, of which the following is a specification.

The paper and paper box testing machine which constitutes my invention is designed and constructed for the purpose of providing an accurate and reliable device whereby paper, fabrics, fibre-board and facings of corrugated paper board or any similar thin material may be subjected to various tests in order to determine its strength, to serve as an aid both to manufacturers and to consumers in ascertaining its adaptability for certain purposes, and also as a means of determining whether or not it meets given special requirements. During recent years what is commercially termed double-faced corrugated straw board (the corrugated member usually being made of straw paper) and fibre board have come into extensive use for the manufacture of many kinds of boxes and containers designed for the shipment of all sorts of articles, and railroad and express companies have prescribed certain rules or regulations applicable to such boxes, among which are specified requirements as to the minimum thickness, bending quality and "bursting" strength of the materials of which it is constructed. Among these rules are specifications as to the separate strength of each of the facing sheets, although so far as I am aware no machine has heretofore been known by which the bursting strength of the facings of corrugated board could be tested separately after being made into the corrugated structure. Inasmuch as the corrugated board is a trussed construction in which the facings correspond to girders and are the basic or fundamental elements upon which the strength of the structure depends, tests of such members are of the highest importance. Heretofore, for want of an instrument with which to determine separately the strength of the facings, it has been the practice to make a bursting test of the strength of the board as a whole by means of a machine of the type in which the board is first clamped tightly, the corrugations thereby being more or less crushed, and a pop test made of the combined strength of the parts of the crushed structure. In making such a combined test the facing exposed to pressure, and separated from the opposite facing by the more or less irregularly crushed lining member, sustains the greater part of the strain and is broken first, the opposite facing giving way afterwards, and because of this successive rupture of the facings separately but a partial value of the whole structure is indicated. It is found that in actual practice tests made in this manner sometimes vary 100% in their indications upon spots not more than four inches apart.

In the machine of my present invention a metallic plunger having a relatively small face (approximately, by way of example, of an area equal to that of a circle one-tenth of an inch in diameter) is used for the following reasons. The small area affords entirely adequate bearing for testing a representative group or unit of the fibres constituting the fibre formation of the board, while it is much less liable to encounter a minute weak spot caused by the presence of a minute undigested wood particle and having the effect of a pinhole in initiating a break, like the action of a tack in an automobile tire, although such a spot is in no way inimical to the real structural value of the paper. A further advantage of the small plunger is that it enables the facings of a piece of corrugated board to be conveniently tested separately in the finished board, and provides means for making the test with the same instrument with which the facings were previously tested before being made up into the corrugated board structure. The use of a plunger made of metal or equivalent hard material instead of elastic material such as a rubber diaphragm through which the rupturing or breaking force is applied by hydrostatic pressure as in the type of machine heretofore most widely used for the purpose, further gives accuracy to the test for the reason that all of the strong, long fibres which in the process of manufacture were incorporated in the pulp to give strength and bending quality to the paper, and which in the paper being tested lie in the path of the plunger must necessarily together resist the bursting force and give an indication of their true combined strength. On the other hand, with a contact surface of soft, yielding rubber or the like, the rubber itself yields to the stronger fibers and tends to seek out any minute weak spot in the area under pressure as the starting point of the break, and the test therefore indicates the pressure required to initiate a rupture at any minute weak spot which may exist and which does not impair the value of the sheet, and such a test therefore does not indicate the general value of the paper structure.

One very important feature of my invention in its preferred form relates to the shape of the working face of the plunger head or the die. In paper testing machines heretofore known, the points of contact of the plunger, whether metal or rubber, are circular in outline, and it has been found that with papers in which most of the fibres lie parallel and run "machine-ways" of the paper, forming a sheet having a definite grain, the strain of such a plunger is thrown almost entirely on the longitudinal fibres, because of the greater stretch of the paper across the grain. This is shown by the fact that upon rupture of the paper the line of break is almost invariably transverse to the general direction of the fibres. A test with a circular plunger therefore gives no indication of the strength of the paper in the weaker or splitting direction. It is particularly important to provide a means of measuring the value of paper in this weak direction in the case of paper used in the manufacture of corrugated strawboard designed for the construction of shipping boxes or cartons, because of the fact that a large proportion of such boxes are so constructed that the ends of the box are each closed by four flaps folded down in pairs towards each other, and in consequence of practical consideration in cutting the blanks the hinge lines of the flaps lie machine-ways of the paper, in which direction they are more liable to split or tear at the hinge lines than if the grain of the paper ran in a transverse direction. It is therefore important that the fibres shall extend in all directions and be well matted in paper intended for such use, and this wedge-faced plunger will indicate how well the matting of the fibres in all directions has been done. In my new machine the plunger is formed with a wedge-shaped working face, or a rectangular face having two or more wedge-shaped ridges, which in making a test may be arranged either to lie parallel with the fibres running with the grain or transversely of them. The relative value or strength of the paper in the grain direction and across the grain, and the relation of these values to the value obtained from a test with the usual circular plunger (which may also be used in the machine) are thus readily obtained, affording valuable information to the manufacturer and user as to the adaptability of the paper for particular uses, and also the direction in which the paper should be cut or patterned for particular purposes. The "woof" value of fabrics may be determined in the same manner.

The plunger of my machine is a sliding member to which a vertical straight-on movement is imparted by the stress of a helical spring, indicating means being provided to show the degree of compression of the spring and hence the pressure necessary to effect a rupture of the material being tested. Because of the direct longitudinal movement of the plunger it is not subject to variations which would arise from a shearing movement as in the case of some prior machines in which the plunger element moves in an arcuate path. The point of contact is unvarying in size and uniformly acted upon by the plunger, with the result that great accuracy is attained.

My machine may be used to test the bursting strength of the component parts of single faced corrugated board, and to make similar tests of the strength of various kinds of paper, fibre-board, fabric, and other thin materials, and also to measure the crushing or cushion strength of the corrugated member of corrugated paper board. I have also provided means for testing the strength of the glue joint or bond between the crests of the corrugations of the corrugated member and the facing members, and for measuring the tensile strength of materials.

In addition to these tests my machine is provided with indicating means for showing the amount of deflection which a material exhibits before rupture occurs in a bursting test, and the amount of stretch before breaking in testing the tensile strength of materials.

With the above purposes, and incidental objects and advantages in view I have devised and invented the paper and paper box testing machine hereinafter more particularly described, the essential elements of my invention being recited in the appended claims.

Of the drawings, Fig. 3 is a vertical section of the top part of the machine taken on a plane lying centrally of the shaft of the operating handle; Fig. 4 is a detail taken on the same plane as the left hand portion of Fig. 2; Fig. 5 is a central vertical section of a spring stop for holding the foot of the machine frame in either one of its two positions in the bed plate, and Fig. 6 a horizontal section of the same taken on the line 6—6 of Fig. 5; Fig. 14 is a front view of the machine showing clamps arranged to secure a strip of paper in position for making a test of its tensile strength; Fig. 15 is a perspective of a strip of material notched preparatory to being tested; Fig. 16 is a top plan view of a detachable clamping member; Fig. 17 is a fragmentary side view of the lower portion of the plunger frame and shaft and the adjacent portion of the bed plate, showing an attachment in position for testing the strength of the glue joint between the corrugated and facing members of a piece of corrugated paper board; Figs. 18 and 19 are respectively end and top views of such attachment; Fig. 20 is a detail side view on a large scale showing one form of detachable plunger head or die for making a bursting test of the strength of sheet material, attached to the plunger shaft; Fig. 21 is a horizontal section of the same on the line 21—21 of Fig. 20; Fig. 22 is a bottom view of the same plunger head, and Fig. 23 a diametrical section of the plunger head alone, taken in a plane at right angles to the position shown in Fig. 20; Fig. 24 is a bottom plan view of a different form of plunger head; Figs. 25 and 26 side and top views respectively of another different form of plunger head for testing the crushing strength of corrugated paper board; Fig. 28 a vertical section of the central portion of the bed plate of the machine and adjacent parts, taken in the same plane as Fig. 1 but with the plunger frame in its lower level.

The same reference characters indicate the same parts in all the figures of the drawing.

Figures 1, 13, 27:
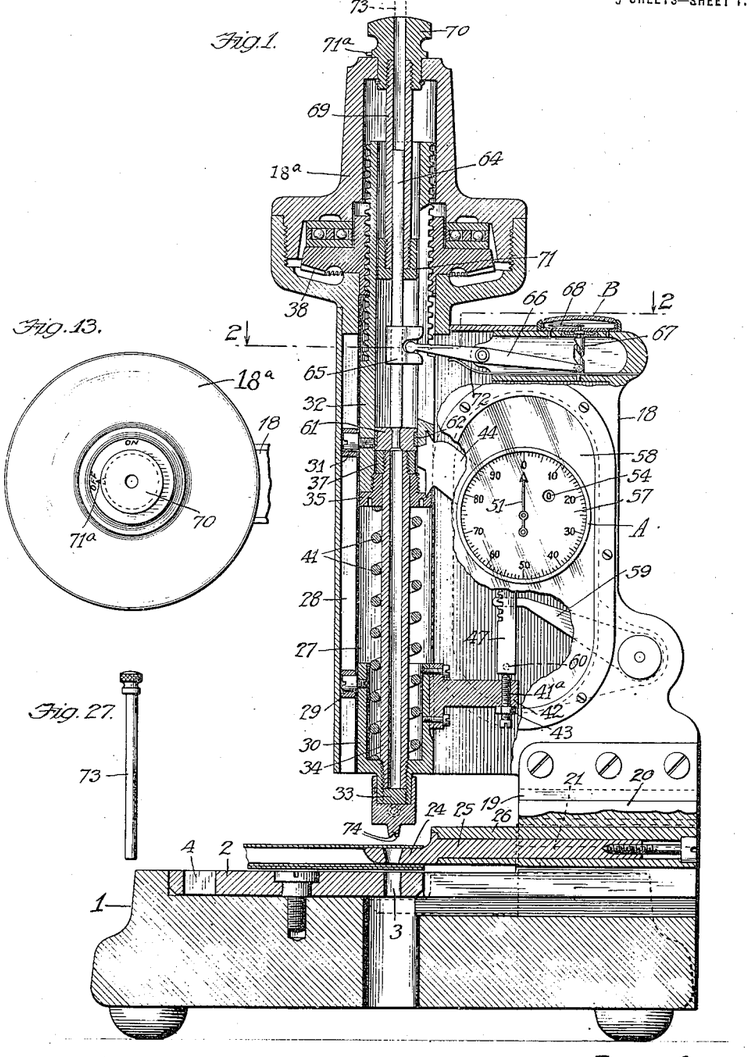
Fig. 1 is a central vertical section of the machine on the line 1—1 of Fig. 2, certain portions being shown in elevation.
Fig. 13 shows a pointer and set button on the top of the frame of the machine for rendering operative or for disabling a friction clip or clutch operatively connected with an indicator for measuring deflection.
Fig. 27 a view of a tool for depressing a friction disk connected with the deflecting-indicating dial.
Figures 2, 7, 8, 9:
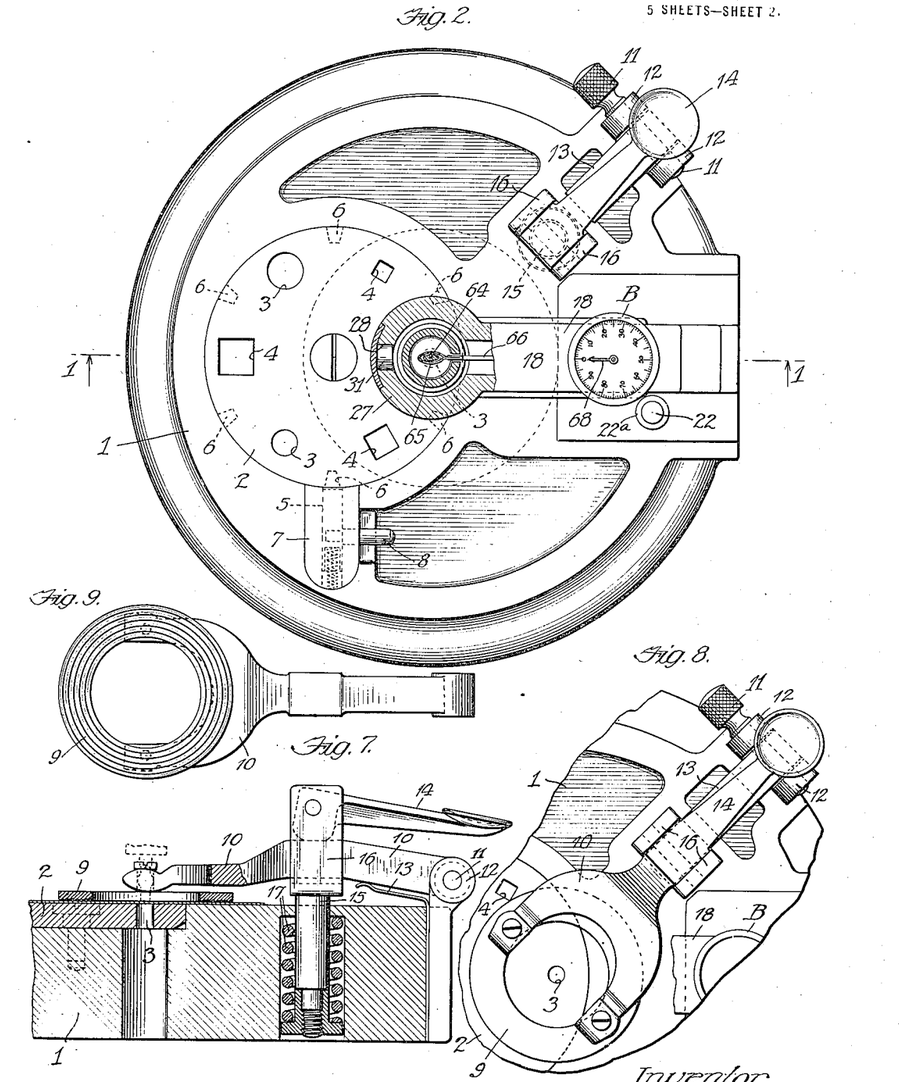
Fig. 2 is a horizontal section looking downwardly on the broken line 2—2 of Fig. 1, parts of the bed plate and casing being shown in elevation.
Fig. 7 is a fragmental vertical section of a portion of the bed plate showing, partly in elevation, the paper clamp.
Fig. 8 is a top plan view of the same.
Fig. 9 is a top view of the clamping member detached.

Describing now the particular embodiment of my invention illustrated in the drawings, the bed plate 1 of the machines consists of a metal casting of sufficient weight to afford stability to the plunger frame and mechanism supported thereby, see Figs. 1 and 2. Rotatably mounted in a seat formed in the upper surface of the bed plate is a disk plate 2 having adjacent its margin a series of circular wells or orifices 3 and square wells 4 of different sizes so arranged that by turning the plate any desired orifice may be brought into alignment with the plunger and central opening in the bed plate. A spring pressed catch 5 arranged to engage any one of a series of peripheral sockets 6 in the disk plate 2 is provided for retaining the latter in any one of its different positions, this catch being mounted in a block 7 seated in the bed plate, and equipped with a manually operable pin 8 by which it may be disengaged to change the adjustment of the disk. The upper surface of the disk is flush with the top surface of the bed plate, and the two form a table for the support of paper, or other thin sheet material, in making a test of its bursting strength.

For the purpose of holding such material firmly and with uniform pressure on the paper table while making a bursting test, I have provided a removable clamping device (see Figs. 2, 7, 8 and 9), consisting of an annular clamping ring 9 flexibly connected by pivot pins to the ends of the branches of a forked lever 10 which is pivoted by a removable pin 11 to lugs 12 formed at the margin of the bed plate, the lever and attached clamping ring being preferably pressed upwardly, as shown, by a light spring 13. The clamping ring, which is arranged concentric of the central orifice in the bed plate, is yieldingly forced down upon an interposed sheet of paper by means of a cam lever 14 pivoted between the ears of a spring-pressed bolt 15 having a U-shaped head 16 and being slidingly mounted in a socket in the bed plate, and the spring 17, which is of sufficient strength to afford firm pressure, and is compressed between the top of the socket and a retaining nut at the end of the bolt by the action of the cam face of the operating lever.

Figures 3, 4, 5, 6, 28:
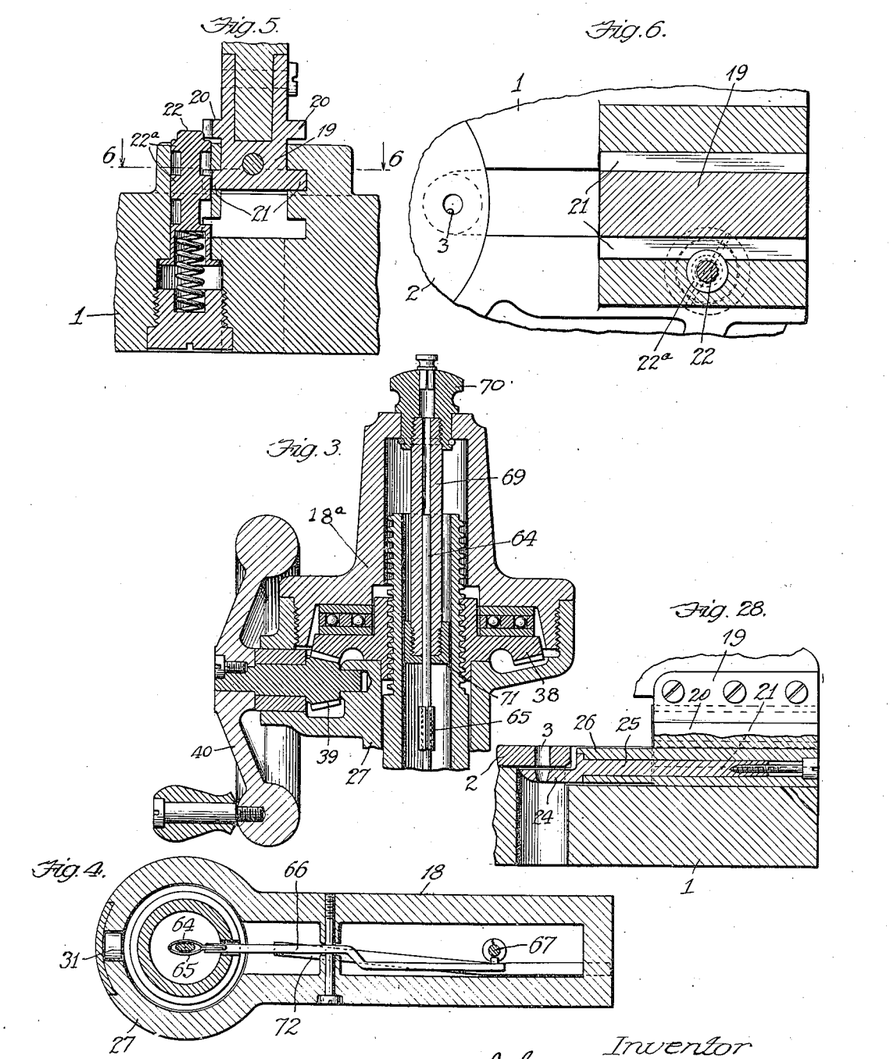
Figure 10:
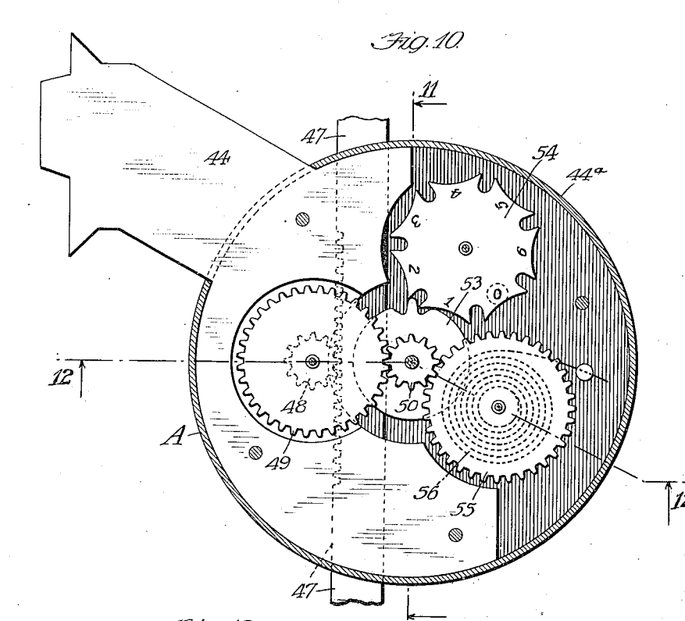
Fig. 10 is a view, partly in vertical section on a plane just inside of the front of the indicator casing showing the bracket carrying the pressure-indicator and the indicator mechanism.
Figure 11:
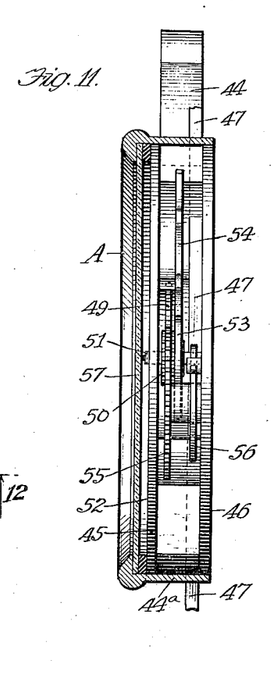
Fig. 11 is a central vertical section through the indicator casing, as indicated by the dotted section line 11—11 of Fig. 10.
Figure 12:
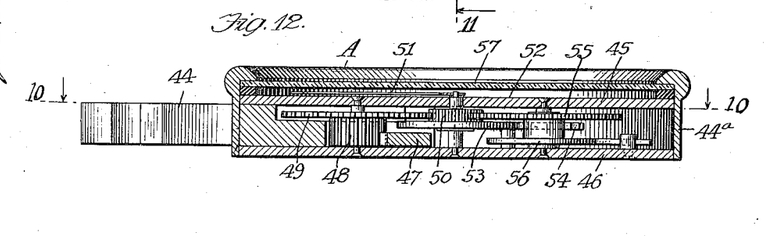
Fig. 12 is a partly horizontal section of the same on the broken line 12—12 of Fig. 10, looking upward as indicated by the arrow.

The plunger frame 18 of the machine, up which are mounted the spring-driven plunger and its operating mechanism, together with two dials and associated mechanisms, one for indicating the tension of the plunger spring and one for indicating the deflection exhibited by material under pressure by the plunger, is attached to the bed plate of the machine by means of a foot block 19 arranged to slide laterally at either of two different levels into engaged position in ways formed in a slide way in the bed plate. For convenience of manufacture, and as shown, the foot block may be formed separately from the metal of the frame and secured thereto by screws or other suitable means. In the present instance, the foot block is formed with an upper pair of opposite slide ribs 20—20 and a single lower pair of slide ribs 21—21, adapted to engage complementary grooves formed in the bed plate, either at the upper level shown in Figs. 1 and 5, or the lower level shown in Fig. 28. In its engaged innermost position, whether in the upper or lower level, the plunger hereinafter described will stand in vertical alignment with one of the openings in the rotatable disk plate and the central opening or well in the bed plate, a spring-pressed sliding button 22 formed with peripheral flanges 22ª adapted to cooperate with segmental notches in the ribs 20 and 21 being provides to retain the plunger frame in whichever position it may be placed.

It may here be explained that in making tests of the paper composing the facing members of corrugated paper board the plunger frame is placed in the upper level, in which position an orificed finger 24 formed with a flat upper face and a rounded lower face whereby it is adapted to fit into one of the corrugations and form a support for the board is exposed. This finger is formed upon the inner end of a rod 25 carried by a short arm 26 extending towards the center from the foot plate of the plunger frame, and in the present instance the arm and rod member is made removable to permit replacement in case of accidental injury and to provide for interchanging fingers of different sizes. In the lower level the finger lies immediately below the disk plate 2, the bed plate being cut away to receive the finger and the arm supporting it.

The plunger mechanism, which will next be described, comprises essentially an upper, actuating member and a lower plunger member telescoping with it and intermediately connected therewith by a spring, the plunger member being equipped with a plunger head or die for puncturing or otherwise acting upon the material being tested, and the upper, plunger-actuating member being provided with a train of gearing by means of which the connected elements may be forced downwardly against the material to transmit pressure through the spring to the plunger member.

Both the upper and lower members are mounted in a barrel 27 formed in the casting which constitutes the intermediate part of the plunger frame 18 and in a cap 18ª forming the top portion of such frame, and such members are arranged in axial alignment with the central orifice of the bed plate and the orifice in the finger 24 as well as one of the orifices in the plate 2. A longitudinal guide slot 28 is cut in the barrel 27 to receive a guide roller 29 carried by the plunger member 30, and a guide roller 31 carried by the plunger-actuating-member 32.

The plunger member is shouldered to form a depending cylindrical portion equipped with a pin adapted to make a bayonet joint with the die or other contact member of the plunger. In the present instance the reduced end portion of the plunger member is formed with a screw-threaded bore, the lower end of the bore being closed by a plug 33 and the upper portion engaging the lower threaded end of an upwardly extending rod 34. The upper end of this rod makes sliding engagement with an orificed plug 35 screwed in to the threaded lower end of the tubular plunger-actuating-member 32. The lower face of a nut 37 carried by the upper screw-threaded end of the rod 34 cooperates with upper face of the plug 35 to limit relative movement of the plunger-actuating and plunger members in a direction to separate them.

The upper part of the plunger-actuating member is exteriorly threaded to engage threads formed within the hub of a bevel gear wheel 38 which is journaled in a seat near the upper end of the barrel 27 of the frame. A thrust ball bearing of ordinary construction is arranged at the upper side of the gear wheel to sustain the upper thrust of the plunger-actuating member and insure smoothness of operation. The gear wheel is rotated by a bevel pinion 39 having a shaft journaled in the frame, to which shaft is rigidly secured a hand wheel 40.

The spring 41 of the plunger mechanism is of such strength as to transmit sufficient pressure to the plunger dies used in the machine to cause a rupture of the strongest paper board to be tested, without reaching its elastic limit. Its length is such that when the plug 35 and nut 37 are in contact the spring will just touch its opposite seats without compression. With this construction and arrangement of parts it is obvious that when the plunger members are lowered upon a sheet of paper or cardboard or similar material, the plunger-actuating member and plunger member will travel together until the plunger point contacts the material, after which the lower or plunger member will remain almost stationary, yielding somewhat under the increasing pressure, until a point is reached at which the paper will rupture and the plunger point break through it. Since it is a law of physics that the stress applied to a spring produces a compression directly proportional to the stress, it is manifest that proper calibration of the relative movement of the upper and lower members of the plunger mechanism will give an indication of the stress required to produce a rupture of the paper.

The mechanism for indicating relative movement between the plunger-actuating and plunger members, and consequently the stress of the plunger spring, comprises a contact member carried by the plunger member and a train of gearing mounted on the plunger actuating member and connected to the hand of a stress-indicating dial A, said train of gearing being actuated through a contact member cooperating with said first-mentioned contact member, see Figs. 1, 10, 11 and 12. The lower contact member consists of a vertical screw 41ª carried by a bracket 42 secured to and extending laterally from the plunger member through a slot at the rear of the plunger barrel and into a narrow vertical chamber formed by parallel portions of the frame constituting a dial housing continuous with the barrel on opposite sides of said slot. A lock nut 43 enables the contact screw to be firmly secured in any position to which it may be adjusted. The dial mechanism is mounted upon a bracket 44 secured to the upper or plunger-actuating member, to which is secured a dial casing having a rim 44ª and front and rear plates 45 and 46, respectively. Extending vertically through the dial casing is a sliding rack-bar 47, the lower end of which cooperates with the contact screw 41ª carried by the lower plunger member and constitutes the upper contact member. This rack-bar meshes with a small pinion 48 whose arbor is mounted in the side plates of the dial and carries a larger pinion 49 meshing with the small pinion 50 secured to a shaft to which is fixed an indicating hand 51 arranged to play over a dial 52 at the front of the dial casing. This shaft also carries a disk 53 formed with a single tooth adapted to cooperate with a Geneva lock counting wheel 54 which carries a series of numbers (in the present instance 1 to 6) which, as the wheel is intermittently rotated by the single tooth of the disk 53, successively come in front of a sight opening in the dial plate. As the dial is graduated from 1 to 100, these numbers indicate hundreds. In order to take up lost motion between the gear wheels and ensure smooth working, an idle gear wheel 55 meshing with the pinion 50 and tensioned very slightly by a hair spring 56 is provided.

As shown, and preferably the dial face is protected by a cover glass 57, and the adjacent side of the dial housing of the frame is formed with a window in which is secured a glass plate 58.

Resetting means are provided by which the indicator hand may be restored to zero position subsequent to making a test and after the upper plunger-actuating member has been elevated to relieve the tension of the spring this mechanism consisting of a rocking arm 59 the end of which is adapted to cooperate with a pin 60 carried by the rack-bar 47, the arm being upwardly spring pressed out of engagement and being arranged to be rocked downward by means of a knob upon its shaft to shift the rack downwardly into contact with the contact screw 41ª on the plunger member and thus turn the indicator hand back to zero.

In making either the bursting strength of a piece of material or a breaking test of the tensile strength of a strip of the same, the material will exhibit more or less give or stretch before a rupture occurs, and this give is evidently measured by the downward travel of the lower plunger member after contact and previous to its rupture. To provide for an indication of this movement in my new machine I employ a sliding disk 61 arranged within the bore of the upper plunger actuating member and arranged to cooperate with the top of the lower plunger member, the disk being connected by a weak yielding friction ring 62 seated in its grooved periphery with the upper member, so that as the plunger spring is compressed and the upper member moves downward relatively to the lower member prior to a break of the material the drag due to the spring will maintain contact between the disk and the lower plunger member, although the latter may also be traveling downwardly a lesser distance because of the yielding of the material. This movement of the disk is communicated to a second, deflection-indicating dial B by means of an oval rod 64 having the lower end rotatably connected with the disk and detachably connected through a spring clip 65 with one end of a pivoted lever 66, the other end of such lever being equipped with a pin engaging a spiral groove formed upon a shaft 67 carrying the indicator hand 68, the arrangement and proportions of the parts being in the present instance such as to indicate upon the dial B the movement of the lower plunger member in one-thousandths of an inch. The oval rod 64 is slidingly mounted in a guide tube 69, the upper end of which is equipped with a button or knob 70, rotatably seated in the frame and the lower end of which carries a cup-shaped block 71 through which it makes sliding and also rotatable engagement with the bore of the upper plunger-actuating member. The knob 70 is provided with a pointer 71ª for indicating an "off" position in which the oval rod passes freely through the approximately oval interior of the spring clip 65, and an "on" position at right angles thereto in which the longer diameter of the rod stands transversely of the narrowest part of the clip, thus frictionally connecting the latter to the rod. The free ends of the clip extend into a slot in the plunger-actuating member, by which it is prevented from rotating when the rod is turned to engage or disengage it, and it is sustained in place by its engagement with the end of the lever 66 of the indicating mechanism last above described. The clip and connected parts are made as light and nearly frictionless as possible and a light spring 72 is provided for elevating the forward end of the lever 66, to counteract the weight of the clip and restore the indicator hand to zero when the clip is disconnected from the rod.

From the description and explanation of the function of the parts thus far given the manner in which the machine is used to make a test of the bursting strength of a sheet of material will be readily understood. In making a test of paper, or cardboard, or other uncorrugated material, the frame is placed in its lower level in the bed plate, and the sheet clamped to the table under the plunger. The upper plunger-actuating member having been elevated to lift the connected lower member clear of the table, the plunger spring will be fully extended and by means of the knob of the resetting arm 59 the hand of the pressure dial A is restored to zero. The handle wheel 40 is now operated to lower the plunger-actuating member, the lower or plunger member traveling with it until the plunger point contacts the material being tested. At this point the disk 61 (which has been left at the conclusion of a previous test in a more or less elevated position in the bore of the plunger-actuating member) is forced down into contact with the top of the plunger member by means of a suitable instrument, such as the rod 73 shown in Fig. 27, and the operating knob 70 turned to "on" position to connect the oval rod 64 with the indicating mechanism of dial B, such mechanism having been disconnected by turning the knob to "off" position at the end of the previous test, thus permitting the indicating mechanism of this dial to automatically return to zero position. Upon further operating the hand wheel the plunger spring will be compressed and its stress registered upon the pressure dial A. As the stress increases the material will yield more or less, the depression being registered upon dial B. When the breaking point is reached the plunger point will burst through the material, the contact screw 41ª of the lower plunger member leaving the rack-bar 47, and the top of the plunger member leaving the disk 61, the indications on the dial A and B remaining unaffected and indicating respectively the spring stress necessary to rupture the material and the deflection of the material previous to rupture. The ratio of the plunger operating gearing is such as to produce a relatively slow movement of the plunger point, and the hand wheel is stopped immediately when the break occurs to prevent further registration upon dial B.

In making a test of the facing members of corrugated paper board, the clamp is removed and the machine frame is placed in its upper level, thus exposing the finger 24, as shown in Fig. 1. The piece of corrugated board is then adjusted beneath the plunger with one of the valleys of the corrugated liner fitting under the finger in such manner as to bring the top facing sheet of the board against the flat top surface of the finger directly under the plunger, and the test of this sheet made in the manner above described. The strength of the other facing is arrived at in the same way, the sum of the two facings being the "combined" strength. The corrugated straw member or liner of the board is used for imparting rigidity and giving a cushioning effect, its tensile and bursting strength being practically negligible. In fact, since the effect of the corrugated liner is to separate the facings and cause them to rupture successively under a single "pop" or bursting test of the corrugated board as a whole, the indication given by such a test is misleading, and the true value is more nearly arrived at by taking the sum of the values of the facings, or "girders" as the combined value of the board.

It is of course obvious that the deflection-indicating mechanism of dial B will be disconnected with the operating knob turned to "off" position when it is not desired to use it, and a test made of the bursting strength of the material alone.

The novel plunger head which, as previously stated, constitutes a valuable feature of my new machine is shown in Figs. 1, 20, 22 and 23. As there shown, the working face of the plunger head consists of blunt parallel wedge-like ridges, in the present instance two in number arranged in an oblong field, which when disposed in the direction of the grain of paper having a striated texture will separate groups of longitudinal fibres, breaking the fibres lying transversely, and thus affording an indication of the strength of the transverse fibres. When turned one quarter around the wedge-like edges will cross the longitudinal fibres and a test will therefore give an indication of the strength of the paper in the direction of such fibres.

Figures 14, 15, 16, 17, 18, 19, 20, 21, 22, 23, 24, 25, 26:
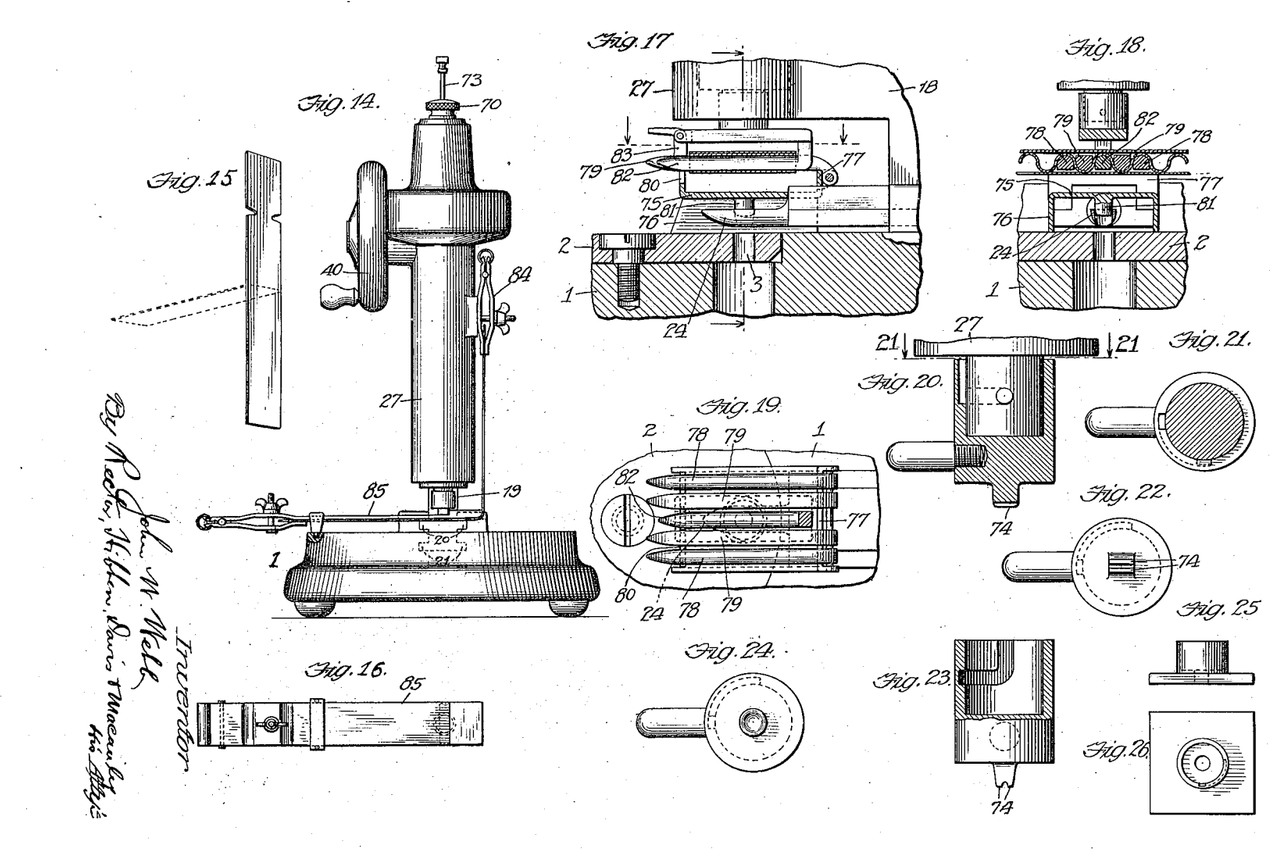

Inasmuch as up to the present time it has been the practice to make puncture tests of paper with a circular plunger or a diaphragm having a circular bearing on the paper, I have provided a detachable plunger of this form. As shown in Fig. 24 the plunger head is slightly cupped at its center, and is slightly rounded at its edge. It may here be explained that for the sake of avoiding the introduction of a new standard in the art the stress-indicating dial A is intended to be so calibrated that when used with either the ridged or circular faced plunger (which are both constructed to afford a bearing surface of approximately the area of a circle one-tenth of an inch in diameter) the indications will agree with the values indicated by well-known testing machines upon a standard cardboard of good uniform quality and of substantially uniform strength in all directions, upon which they give fairly accurate results. Nominally the indications give the bursting stress in pounds per square inch.

The round holes or wells 3 of the disk plate 2, it may be explained, have the same clearance with reference to the round faced die as the square wells 4 have with respect to the ridged die. A die having a face consisting of a single long rib may be used for the same purpose, and will also be found particularly fitting in evaluating the relative strength of the warp and woof threads composing woven fabrics.

In Figs. 17, 18 and 19, I have illustrated a two-piece attachment for testing the strength of the glue joint between the crests of the corrugations of the liner, and either of the facing sheets of corrugated paper board. The device comprises a plate 75 having depending supporting side flanges 76 and a vertical flange 77 at one end formed with ears between which extends a pivot upon which are mounted four fingers, the two outer fingers 78, 78 being rounded on top and flat underneath and the two inner fingers 79, 79 being flat on top and rounded underneath. The free ends of the fingers are arranged to be supported in horizontal position by a vertical flange 80 on the front end of the plate 75. When this attachment is to be used the machine frame is placed in its upper level, and the plate placed in the position shown underneath the plunger, a pin 81 on the underside of the plate and adapted to engage the orifice in the finger 24 permanently secured to the frame being provided to maintain the device in position.

The other part of the attachment consists of a plunger head carrying a horizontal finger 82, shorter and somewhat smaller than the fingers 78 and 79, having a rounded top and a flat bottom surface and adapted to be inserted under the crest of an upwardly extending corrugation in a strip of corrugated paper board, intermediate and parallel with the inner pivoted fingers 79, 79 of the supporting plate in adjacent spaces, as shown in Fig. 18. In practice the plunger is lowered until the finger of the plunger head and the pivoted fingers are nearly in alignment, when the corrugated board, which is cut transversely of the corrugations into a strip slightly narrower than the length of the finger, may readily be slipped over all the fingers, and a pivoted supporting block 83 carried by the plunger head be thrown down upon the outer end of the finger 82 to brace it at that end. When the plunger head is depressed by operating the hand wheel the finger 82 of the head will force the lower facing sheet away from the corrugated liner, which is supported by the fingers 78 and 79, thus testing the strength of the glue joint between the lower facing sheet and crests of the corrugations.

For the purpose of testing the tensile strength of materials, the machine is provided with a clamp 84 secured to the upper part of the machine frame, and a removable rocking clamping attachment consisting of a top plate 85 equipped at its outer end with a clamp and adapted to rock upon a couple of legs loosely engaging sockets in the bed plate of the machine, the rounded inner end of the plate being arranged to cooperate with the plunger head. The material to be tested is preferably cut in the form shown in Fig. 16 (by a suitable sheet metal pattern, or otherwise), and with the machine frame in its lower level and the plunger in raised position, the paper is secured to the clamps, passing around the inner end of the plate 85, which is in raised position against the plunger head. A test being made in the manner hereinbefore described, the breaking strength of the strip will be indicated upon dial A, and the amount of stretch before the break may be shown upon dial B by connecting the actuating mechanism of that dial.

In determining the amount of pressure necessary to crush the corrugations of the liner of corrugated paper board, a plunger head having a flat lower face of given area, as for instance one square inch, is employed. The amount of pressure is indicated on the stress-indicating dial A, and deflection of the board under any given degree of compression is indicated on the deflection-indicating dial B.

It is obvious from the foregoing description of my novel paper and paper box testing machine that it is well adapted to accomplish the purposes for which it is designed and that it remedies various defects inherent in paper and paper box testing apparatus heretofore commonly used in the paper industry. It is further evident that various changes may be made in the construction and arrangement of parts of my machine without varying essentially its mode of operation or departing from my invention, and I therefore do not intend my claims to be limited to the specific details of construction above described.

I claim:

1. In a machine of the character described, a plunger-actuating member, a plunger member, a spring arranged to transmit stress from said plunger-actuating member to said plunger member, means for measuring the deflection of said spring including a contact member fixed to said plunger member and an indicating mechanism carried by said plunger-actuating member and including a rack bar arranged to be shifted by said contact member only upon relative movement of said members in a direction to increase the stress of the spring.

2. In a machine of the character described and having a bed plate and a frame mounted on said bed plate and having a vertical barrel formed with a vertical guide slot, a plunger member slidingly arranged in said barrel and equipped with a guide engaging said slot, a plunger-actuating member arranged in said barrel above said plunger member and also equipped with a guide engaging said slot, a spring interposed between said members, and indicating means intermediate said members for measuring the compression of the spring.

3. In a machine of the character described and having a bed plate and formed with a vertical barrel, a plunger member slidingly arranged in said barrel, a plunger-actuating member arranged in said barrel above said plunger member, said plunger-actuating member having a portion of its outer surface screw-threaded, a gear wheel rotatably mounted in the frame and having a screw-threaded bore engaging the threads upon the plunger-actuating member, means for rotating said gear wheel, a spring interposed between said plunger member and said plunger-actuating member, and indicating means intermediate said last mentioned two members for measuring the compression of the spring.

4. In a machine of the character described, plunger-actuating mechanism according to claim 3 in which an anti-friction thrust bearing is arranged to receive the thrust of the gear wheel.

5. In a machine of the character described, plunger-actuating mechanism, according to claim 3 in which said gear wheel is a bevel gear and a second manually operable bevel-gear wheel is arranged to mesh with said first mentioned gear wheel.

6. In a machine of the character described, a vertically arranged plunger actuating member, a plunger member having telescoping connection with said plunger-actuating member, means for limiting the downward movement of said plunger member relative to said plunger-actuating member, a spring intermediate said members tensioned by relative downward movement of said plunger-actuating member with respect to said plunger member, and means for measuring said relative movement.

7. In a machine of the character described, a vertically arranged plunger-actuating member, a plunger member having telescoping connection with said plunger-actuating member, means for limiting the downward movement of said plunger member relative to said plunger-actuating member, a spring intermediate said members and under no tension at the limit of such relative downward movement and tensioned by movement in the opposite direction, and means for measuring such tensioning movement.

8. In a machine of the character described, a plunger mechanism according to claim 7 in which the plunger-actuating member is tubular and formed with a stop at its lower end and said plunger member is formed with a vertical stem equipped with a head coacting with said stop.

9. In a machine of the character described, a plunger mechanism according to claim 7 in which the plunger-actuating member is tubular and formed with an annular stop at its lower end and said plunger member is formed with a vertical stem slidingly engaging said annular stop end and is equipped at its top with a head arranged to cooperate with such stop.

10. In a machine of the character described, a plunger member, a plunger-actuating member, a spring arranged to transmit stress from said plunger-actuating member to said plunger, and deflection-indicating means frictionally connected to said plunger-actuating member and cooperating with said plunger member to register downward movement of the latter with respect to the frame of the machine during relative movement of said two members in a direction to compress the spring.

11. In a machine of the character described, a plunger member, a sliding tubular plunger-actuating member, a spring arranged to transmit stress from said plunger-actuating member to said plunger, and deflection-indicating means including a friction block arranged within said plunger-actuating member and arranged to cooperate with said plunger member for registering downward movement of the latter with respect to the frame of the machine during relative movement of said two members in a direction to compress the spring.

12. In a machine of the character described and having a frame formed with a vertical barrel, a sliding plunger member arranged in said barrel, a sliding tubular plunger-actuating member also arranged in said barrel, a spring arranged to transmit stress from said plunger-actuating member to said plunger member, a disk frictionally engaging the bore of said plunger-actuating member and arranged to cooperate with said plunger member, a deflection-indicating dial and indicating hand, and connections intermediate said disk and said indicating hand.

13. In a machine of the character described, mechanism according to claim 12 in which said connections include a rod engaging said disk and a clutch member arranged to be connected with and disconnected from said rod.

14. In a machine of the character described, mechanism according to claim 12 in which said connections include a rod rotatably engaging said disk and a friction clip arranged to be engaged with said rod and disengaged therefrom by turning the rod.

15. In a machine of the character described, mechanism according to claim 12 in which said tubular plunger-actuating member is formed with a longitudinal slot and said connections include an oval rod rotatably connected to said disk and also include a U-shaped clip whose free edges are loosely arranged within said slot and a lever engaging said clip and operatively connected with said indicating hand.

16. In a machine of the character described, a plunger member, a sliding tubular plunger-actuating member, a spring arranged to transmit stress from said plunger-actuating member to said plunger member, deflection-indicating means including an indicating hand and a disk frictionally engaging the bore of said plunger-actuating member and a rod rotatably connected to said disk and a clutch member arranged to operatively connect and disconnect said rod and said indicating hand in different angular positions of the rod, and means for turning the rod to connecting and disconnecting positions.

17. In a machine of the character described, mechanism according to claim 16 in which the means for turning the rod includes a manually operable rotatable member having non-rotatable sliding engagement with such rod.

18. In a machine of the character described, mechanism according to claim 16 in which the means for turning the rod includes a manually operable rotatable member journaled in the frame of the machine and also slidingly arranged within the bore of the plunger-actuating member and having non-rotatable sliding engagement with the rod.

19. In a machine of the character described, a plunger-actuating member, a plunger member, a spring arranged to transmit stress from said plunger-actuating member to said plunger member, stress-indicating means intermediate said last-mentioned two members for measuring the deflection of the spring, deflection-indicating means intermediate the frame of the machine and said plunger member for measuring their relative movement, and means for connecting and disconnecting such deflection-indicating means.

20. In a machine of the character described, mechanism according to claim 19 in which the plunger-actuating member is equipped with a stress-indicating dial and a deflection-indicating dial is mounted on the frame of the machine and in which the plunger member is formed with a contact member cooperatively connected with said stress indicating dial and is also arranged to be cooperatively connected with said deflection-indicating dial and disconnected therefrom.

21. In a machine of the character described, a plunger frame formed with a vertical barrel and a connected dial housing, a tubular plunger-actuating member slidingly arranged in said barrel, a plunger member also slidingly arranged in said barrel, a spring arranged to transmit stress from said plunger-actuating member to said plunger member, a stress-indicating dial supported by said plunger-actuating member and arranged within said dial housing, a contact member mounted upon said plunger member and extending into said housing and arranged to cooperate with said stress-indicating dial.

22. In a machine of the character described, a bed plate, a paper table on said plate, a plunger frame, plunger mechanism carried thereby, a finger also carried by said frame and formed to enter a corrugation of corrugated paper board, said frame being adjustable in said bed plate at two levels and said finger lying above said table in the upper level and below said table in the lower level.

23. In a machine of the character described, a bed plate formed with upper and lower horizontal slideways, a paper table on said plate, a plunger frame having a foot block arranged to slide laterally into engaged position in said slideways at either of two different levels, plunger mechanism carried by said frame, a finger also carried thereby and formed to enter a corrugation of corrugated paper board, said finger lying above said table in the upper level and below said table in the lower level.

24. In a machine of the character described and having a supporting frame and a plunger member and stress-indicating mechanism for indicating stress upon the plunger, a plunger head having its bearing face formed with a plurality of parallel ridges arranged in an oblong field.

25. Mechanism for testing the bursting strength in different directions of a sheet of material having a parallel fibrous structure comprising means for supporting said sheet, a plunger member, stress-indicating means connected to said plunger member, and a plunger head having a wedge-shaped face with a rounded edge, said plunger-head and material being relatively adjustable to vary the angular relation of the face with respect to the fibres of the material.

26. In a machine of the character described and having a supporting frame and a plunger member and stress-indicating mechanism for indicating stress upon the plunger, a plunger head having its bearing face formed with an elongated ridge having rounded working edges.

27. In a machine of the character described and having a supporting frame and a plunger member and stress-indicating mechanism for indicating stress upon the plunger, a plunger head having its bearing face formed with a plurality of parallel ridges.

JOHN W. WEBB.